United States Patent [19]

Kimball

[11] 4,343,575
[45] Aug. 10, 1982

[54] APPARATUS FOR TRANSPORTING CONTAINERS

[75] Inventor: Paul A. Kimball, Fulton, N.Y.

[73] Assignee: Phillips Petroleum Company, Bartlesville, Okla.

[21] Appl. No.: 140,897

[22] Filed: Apr. 16, 1980

[51] Int. Cl.³ .............................................. B65G 51/02
[52] U.S. Cl. ...................................... 406/19; 406/108; 414/30
[58] Field of Search ........................ 406/19, 21, 22, 52, 406/77, 79, 82, 83, 108, 198; 198/402, 569; 414/30, 105, 109

[56] References Cited

U.S. PATENT DOCUMENTS

| 2,912,282 | 11/1959 | Schult | 406/52 |
| 3,086,822 | 4/1963 | Fibish | 406/79 |
| 3,351,388 | 11/1967 | Frank | 406/79 |
| 3,502,195 | 3/1970 | Benner | 406/82 X |
| 3,732,917 | 5/1973 | Devbel | 198/402 X |

FOREIGN PATENT DOCUMENTS 1200392  12/1959  France ................................. 406/82

Primary Examiner—Jeffrey V. Nase

[57] ABSTRACT

A container is received during processing, transported in a mouth-down orientation, and then transported bottom-first through a tube for further processing, for example, stacking.

3 Claims, 3 Drawing Figures

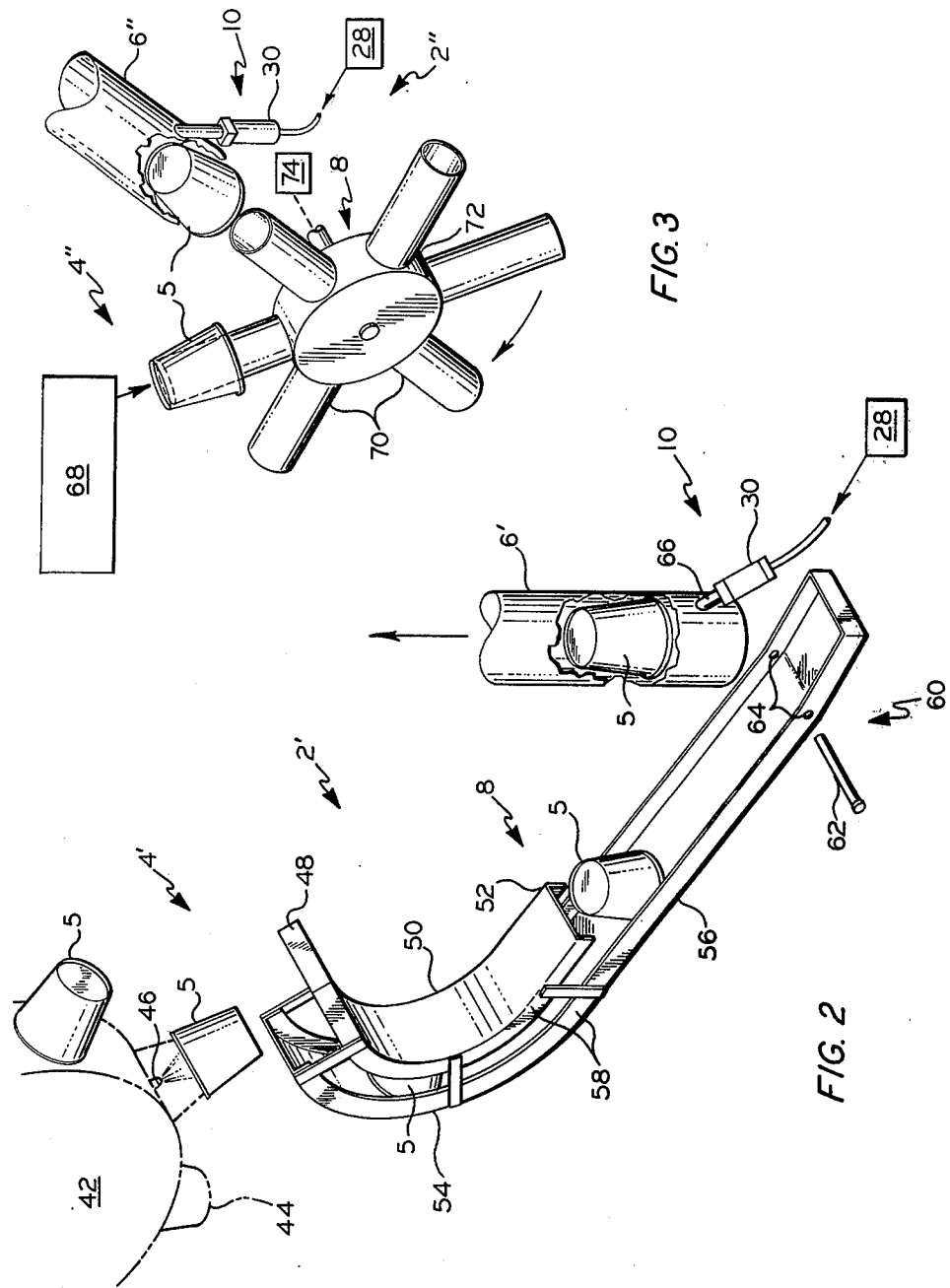

APPARATUS FOR TRANSPORTING CONTAINERS

BACKGROUND OF THE INVENTION

This invention relates to an apparatus for changing the direction of movement and/or orientation of containers during their processing. In another aspect, the invention relates to a method for orienting and/or changing the direction of movement of containers during processing.

It is difficult to transport containers having a high diameter to height ratio by automatic means because such containers are aerodynamically unstable. The propulsion of such containers often causes the containers to tumble, resulting in waste and jammed machinery. It is extremely difficult to change the orientation or direction of travel of such containers without tumbling a significant percentage of them. Containers having a high diameter to height ratio are most difficult to transport in a mouth-first orientation. There is thus a need for an apparatus capable of reliably orienting and transporting such containers in a side-first or bottom-first position.

It is thus an object of this invention to provide an apparatus for orienting and transporting a container.

It is further an object of this invention to provide an apparatus for changing the orientation of a container by any desired amount.

It is another object of this invention to provide an apparatus for changing the direction of container travel without tumbling the container.

It is another object of the invention to provide an apparatus for accomplishing the above objects for containers having a high diameter to height ratio.

It is yet another object of this invention to provide methods for accomplishing the above objects.

DESCRIPTION OF THE DRAWINGS

FIG. 2 is a pictorial illustration of a second embodiment of the invention.

FIG. 3 is a pictorial view of a third embodiment for changing the direction of a container.

SUMMARY OF THE INVENTION

Figure 1:
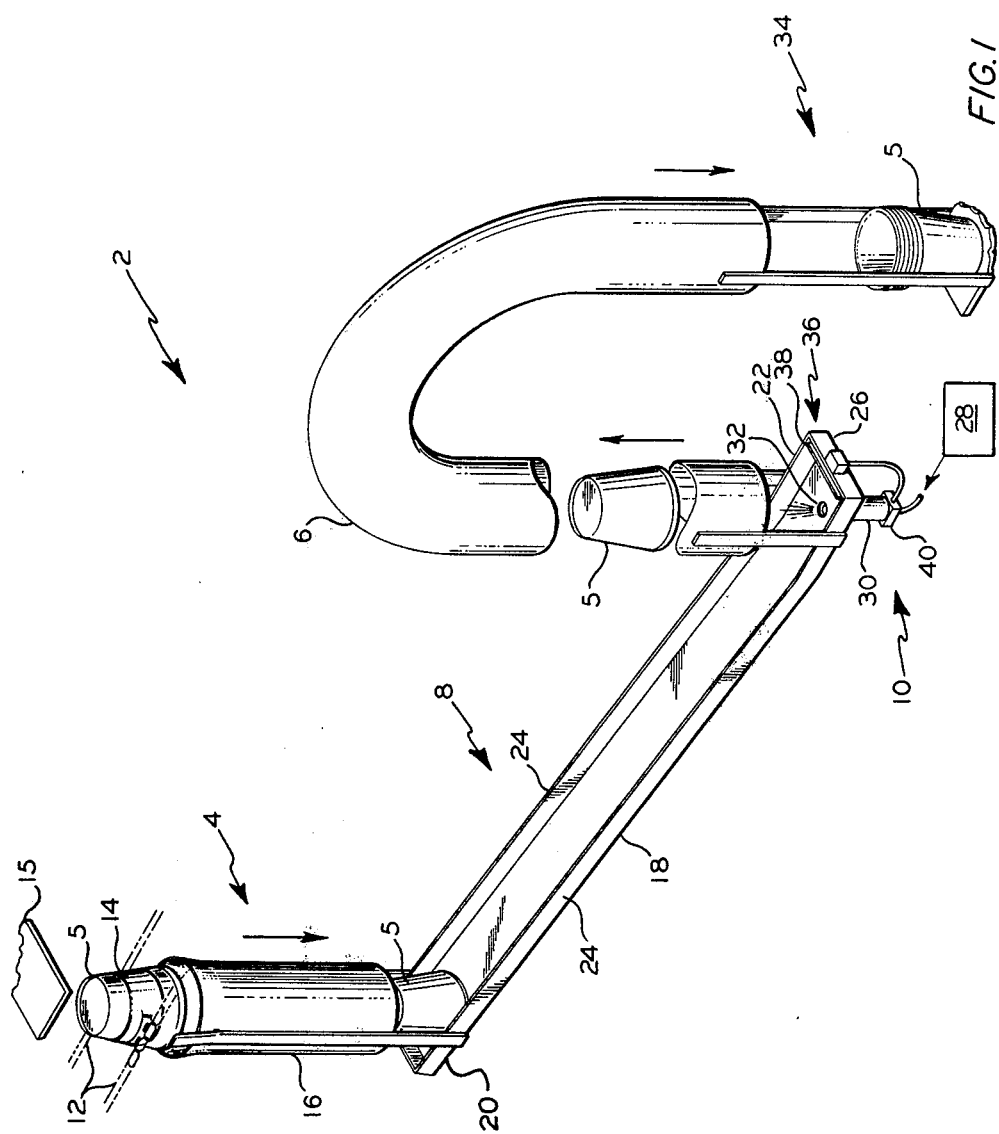
FIG. 1 is a pictorial illustration of a preferred embodiment of the invention.

In accordance with one embodiment of the present invention, an apparatus comprises a means for receiving a container, a tubular member having an inlet and an outlet with a bore between the inlet and the outlet having a diameter sufficiently large to allow the passage of a container therethrough, means for transporting the container from the receiving means to a position in close proximity to and in bottom first axial alignment with the inlet of the tubular member, and means for propelling the container bottom-first into the inlet of and through the bore of the tubular member.

In accordance with another embodiment of the present invention, a container is conveyed to a mouth-down position underneath and in axial alignment with the inlet of a tubular member having a bore therethrough with a diameter sufficiently large to allow passage of the container and propelled through the bore of the tubular member.

DETAILED DESCRIPTION OF THE INVENTION

In FIG. 1, reference number 2 designates generally an apparatus for changing the direction of travel of a container. The apparatus 2 comprises a means for receiving a container such as a container from an upstream processing step, designated generally by the reference numeral 4, a tubular member 6 which has an inside diameter sufficiently large to allow the passage of a container therethrough, a means 8 for transporting a container from the receiving means 4 to the tubular member 6, and a means 10 for propelling a container 5 bottom-first into the inlet of the tubular member 6 and its interior. In the embodiments shown in the Figures, the apparatus 2 is useful for changing the direction of travel of container 5 from generally a downward direction to generally an upward direction, without tumbling the container. It is often necessary that the direction of container travel be changed from generally a downward direction to generally an upward direction in the processing of containers, and prior art apparatus suffered from imprecision which frequently resulted in an unsuccessful operation.

Referring again to FIG. 1, a container 5 is received into receiving means 4 from an upstream processing step. As illustrated, the container 5 is received from a pair of endless parallel chains 12 having container-fitting loops 14 mounted therebetween. At the proper time, the container 5 is contacted by a paddle 15 to release it from the loop 14 from whence it falls a short distance in a mouth first orientation to receiving means 4. In the illustrated embodiment, the receiving means 4 comprises a tubular member 16 which has an inside diameter slightly larger than the outside diameter of the container 5. The container 5 falls mouth first into the upper end of the tubular member 16. The upper end of the tubular member 16 is within about 1 container height of the bottom edge of loop 14 which is normally sufficient to prevent the container 5 from tumbling between loop 14 and tubular member 16. Gravity assists the passage of the container 5 through the tubular member 16 and it exits at the lower end of the tubular member 16 and onto the means 8 for conveying a container in a mouth-down position. In the embodiment illustrated, the means 8 comprises a ramp 18 having an upper end 20 and a lower end 22 with the upper end 20 located under the lower end of the tubular member 16. The upper end 20 of ramp 18 is generally located within from about 1.1 to about 2 container heights from the lower end of the tubular member 16 and is preferably located within less than about 1.5 container heights from the lower end of the tubular member 16, or the apparatus is provided with container guides intermediate the lower end of the tubular member 16 and the upper end 20 of ramp 18, because the container 5, being conveyed in a mouth-first orientation at this location, is aerodynamically unstable, and might tumble.

Ramp 18 is oriented to have a negative slope between upper end 20 and lower end 22 sufficient to reliably cause a container 5 to slide from the upper end 20 to the lower end 22 in a mouth down position due to gravitational forces. The ramp 18 has guide flanges 24 on each side thereof, preferably spaced apart at a distance of slightly greater than the outside mouth diameter of the container 5, so that a container 5 is guided down the ramp 18 a position aligned with the inlet of the tubular member 6. Adjacent the position on ramp 18 in alignment with the tubular member 6, the ramp is desirably fitted with a container stop, end flange 26 as illustrated.

As illustrated, the tubular member 6 has a lower end located over the lower end 22 of the ramp 18, preferably at a distance of only slightly greater than a container height, so that the container 5 can slide down ramp 18 into alignment with the inlet of tubular member 6. The inside diameter of the tubular member 6 is slightly greater than the outside diameter of a container 5. In cooperation with the tubular member 6 is the means 10 for propelling container 5 bottom-first into the inlet of the tubular member. As illustrated, the means for propelling container 5 comprises a fluid source 28 in communication with a nozzle 30 in axial alignment with the lower end of tubular member 6 through an aperture 32 in the ramp 18. Fluid from source 28 is directed through nozzle 30 and aperture 32 to propel container 5 into the inlet of and through tubular member 6. The container 5 is directed through the tubular member 6 for further processing, for example, a stacking operation designated generally as 34.

As illustrated, ramp 18 is provided with a container sensing means 36 adjacent its lower end 22. The sensing means 36 comprises a pressure sensitive switch 39 which provides a signal to a valve 40, preferably a fast acting valve, for example, a solenoid valve, interposed between fluid source 28 and nozzle 30. When a container slides down ramp 18 and into alignment with the mouth of tubular member 6, switch 38 is pressed to provide a signal to cause valve 40 to become momentarily opened, so that a burst of fluid passes from fluid source 28 and nozzle 30 to propel container 5 into and through the tubular member 6. Preferably, the fluid employed is compressed air.

Referring now to FIG. 2 there is illustrated an embodiment 2' of the present invention wherein both the orientation and direction of travel of a container 5 are changed. In this embodiment of the invention, a container 5 is partially rotated while passing through means 4' for receiving the container. This embodiment of the invention has special utility for conveying containers received from a container forming apparatus 42 bottom-first, for example, from a mandrel 44 on the apparatus 42.

The container 5 is ejected from mandel 44 by a blast of fluid from a nozzle 46. The container 5 falls bottom first onto an upwardly facing upper end 48 of an inclined ramp 50. The container 5 slides toward the lower end 52 of ramp 50 and falls onto an upper portion 54 of a ramp 56. The upper portion 54 of ramp 56 has a juxtaposed relationship with at least a lower portion of the ramp 50. The two ramps are spaced apart a distance of greater than a container height to allow passage of a container therebetween, but less than a distance which would allow a significant portion of the containers to tumble. Generally, the distance between the ramps will be between about 1.1 and about 2 container heights. The container-bearing surface of ramp 50 follows a generally convex path, while the container-bearing surface of the upper portion 54 of ramp 56 follows a generally concave path. In the embodiment shown, ramp 50 and the upper portion 54 of ramp 56 are generally "C" shaped, with ramp 50 following the inside curve of the "C" and upper portion 54 of ramp 56 following the outside curve. Ramp 50 extends past the upper end of ramp 56, and ramp 56 extends past the lower end of ramp 50 as illustrated, although the ramps can be about the same length if desired. By employing variations of the ramp arrangement shown, a container 5 can be reliably rotated through arcs of up to about 170°.

The ramps are fitted with suitable guide flanges 58, and thus form a roofed trough or chute which has an arcuate shape and guides the container through a change of direction of between about 90° and about 170°, usually between about 120° and 160°. The orientation of the container is changed in a like amount. Ramp 56 desirably is provided with a container stopping means 60 intermediate its upper and lower ends, so that an operator can temporarily interrupt the passage of containers along the ramp. As illustrated, stopping means 60 can be a pin 62 adapted for insertion through apertures 64 in guide flanges 58.

The tubular member 6' is positioned above the lower end of ramp 56 at a distance slightly greater than one container height. In the illustrated embodiment, the means 10 for generating a negative pressure gradient between ramp 56 and the bore of tubular member 6' comprises a conduit 66 which opens into the bore of tubular member 6' at an acute angle pointing away from the mouth of the tubular member. Nozzle 30 directs fluid from source 28 through conduit 66 and into the tubular member, thereby creating a region of low pressure at the inlet of the tubular member 6' sufficient to pull a container 5 into the tubular member. In this embodiment, the flow of fluid from source 30 is preferably continuous, although it can be regulated if desired. The acute angle at which conduit 66 opens into tubular member 6' is not particularly important, but can be, for example, between 10° and 45°.

Referring now to FIG. 3, there is shown another embodiment 2" of the present invention. A container 5 is received from upstream processing, designated generally by 68 by a tubular member 70 mounted radially to a rotatable hub 72. Preferably, the container 5 caps the end of the tubular member 70, rather than fitting inside, because allowable tolerances are greater. For that reason, the outside diameter of the tubular member 70 is smaller than the inside diameter of a container 5. Hub 72 is then rotated from a first position from which the container 5 was received on the spoke 70 to a second position wherein spoke 70 is in axial alignment with the inlet of the tubular member 6" by drive means 74. Drive means 74 is synchronized with upstream processing 68. When spoke 70 is in alignment with tubular member 6", container 5 is pulled from the spoke and into the tubular member 6" due to the negative pressure gradient created by means 10. The container can thus be reliably transported in a bottom first orientation through the tubular member for further processing.

I claim:

1. Apparatus comprising:
   (a) a first tubular member having an inlet and an outlet and an inside diameter sufficiently large to allow the passage of a container therethrough;
   (b) a second tubular member having an upper end and a lower end and an inside diameter sufficiently large to allow the passage of the container therethrough;
   (c) an inclined ramp having an upper end and a lower end with the upper end of the inclined ramp being in alignment with and beneath the lower end of the second tubular member and the lower end of the inclined ramp having an aperture therethrough which is in alignment with and beneath the inlet of the first tubular member; and (d) a fluid source aligned with the aperture so that the aperture establishes a communication path between the fluid source and the inlet of the first tubular member.

2. Apparatus as in claim 1 further comprising a container detecting means adjacent the lower end of the ramp; and a valve in cooperation with the fluid source;

wherein the container detecting means is in cooperation with said valve and is operative to automatically provide a signal to open the valve when the container is at the lower end of the ramp.

3. A method comprising receiving a container in a tubular member having a bore therethrough and passing the container through the bore to an upper end of an inclined ramp;

receiving the container in a mouth-down position on the ramp from the tubular member and sliding the container down the inclined ramp and into a mouth-down position in alignment with an inlet of a second tubular member having a bore therethrough; and propelling the container through the bore of the second tubular member by injecting a fluid through an aperture through the inclined ramp which is in alignment with and beneath the inlet of the second tubular member.

* * * * *